US011215104B2

(12) United States Patent
Winkelmuller et al.

(10) Patent No.: US 11,215,104 B2
(45) Date of Patent: Jan. 4, 2022

(54) COMPONENT HAVING A FLANGE CONNECTION ELEMENT

(71) Applicant: LIEBHERR-COMPONENTS COLMAR SAS, Colmar (FR)

(72) Inventors: Hugues Winkelmuller, Sainte Croix en Plaine (FR); Flavie Brockhoff, Holtzwihr (FR)

(73) Assignee: LIEBHERR-COMPONENTS COLMAR SAS, Colmar (FR)

( * ) Notice: Subject to any disclaimer, the term of this patent is extended or adjusted under 35 U.S.C. 154(b) by 0 days.

(21) Appl. No.: 16/616,451

(22) PCT Filed: Feb. 28, 2018

(86) PCT No.: PCT/EP2018/054938
§ 371 (c)(1),
(2) Date: Nov. 23, 2019

(87) PCT Pub. No.: WO2018/215100
PCT Pub. Date: Nov. 29, 2018

(65) Prior Publication Data
US 2020/0173405 A1    Jun. 4, 2020

(30) Foreign Application Priority Data

May 24, 2017    (DE) ..................... 10 2017 111 472.6

(51) Int. Cl.
| | |
|---|---|
| *F01N 13/10* | (2010.01) |
| *F01N 13/18* | (2010.01) |
| *F16L 23/02* | (2006.01) |
| *F02M 35/10* | (2006.01) |

(52) U.S. Cl.
CPC ......... *F01N 13/1805* (2013.01); *F01N 13/10* (2013.01); *F01N 13/1827* (2013.01);
(Continued)

(58) Field of Classification Search
CPC ............ F01N 13/1855; F01N 2450/24; F02M 35/10085; F02M 35/10144; F16L 23/02; F16L 23/024; F16L 23/028
See application file for complete search history.

(56) References Cited

U.S. PATENT DOCUMENTS

| | | | |
|---|---|---|---|
| 1,376,620 | A | 5/1921 | Hildebrand |
| 3,188,116 | A | 6/1965 | Christensen |

(Continued)

FOREIGN PATENT DOCUMENTS

| | | |
|---|---|---|
| DE | 19954317 A1 | 5/2001 |
| DE | 102005026559 A1 | 12/2006 |

(Continued)

OTHER PUBLICATIONS

Machine translation of FR-2883063-A1, accessed May 6, 2021. (Year: 2021).*

(Continued)

*Primary Examiner* — Jonathan R Matthias
(74) *Attorney, Agent, or Firm* — McCoy Russell LLP

(57) ABSTRACT

Disclosed is a component having a flange connection element connectable to a flange connection counterpart of another component by bolts and/or screws, the flange connection element comprising a contact surface to be pressed against a contact surface of the flange connection counterpart, whereby the contact surface of the flange connection element is formed such that it does not completely surround at least one of the bolts and/or screws. Alternatively or in addition, the flange connection element may have a recess in at least one of its side surfaces using the contact pressure in an edge part of the contact surface extending below the recess.

18 Claims, 6 Drawing Sheets

(52) U.S. Cl.
CPC ......... F01N 13/1855 (2013.01); F16L 23/02 (2013.01); *F01N 2450/24* (2013.01); *F02M 35/10144* (2013.01)

(56) References Cited

U.S. PATENT DOCUMENTS

| | | | | |
|---|---|---|---|---|
| 4,649,614 A | * | 3/1987 | Lund | F01N 13/1805 29/257 |
| 2004/0177609 A1 | * | 9/2004 | Moore, III | F01N 3/2853 60/323 |
| 2013/0140807 A1 | | 6/2013 | Van Dusen | |

FOREIGN PATENT DOCUMENTS

| | | | | |
|---|---|---|---|---|
| DE | 102008010629 A1 | | 9/2009 | |
| EP | 1270890 A2 | | 1/2003 | |
| EP | 253874 A2 | | 11/2010 | |
| EP | 2746559 A1 | | 6/2014 | |
| FR | 2883063 A1 | * | 9/2006 | ............ F16L 23/032 |
| JP | S5867944 U | | 5/1983 | |
| WO | 2018212752 A1 | | 11/2018 | |

OTHER PUBLICATIONS

European Patent Office, Supplementary European Search Report Issued in Application No. 17909777.9, dated Nov. 5, 2020, Germany, 2 pages.
ISA European Patent Office, International Search Report Issued in Application No. PCT/EP2018/054938, dated May 29, 2018, WIPO, 4 pages.

* cited by examiner

COMPONENT HAVING A FLANGE CONNECTION ELEMENT

CROSS-REFERENCE TO RELATED APPLICATIONS

The present application is a U.S. National Phase of International Patent Application Serial No. PCT/EP2018/054938 entitled "A COMPONENT HAVING A FLANGE CONNECTION ELEMENT," filed on Feb. 28, 2018. International Patent Application Serial No. PCT/EP2018/054938 claims priority to German Patent Application No. 10 2017 111 472.6 filed on May 24, 2017. The entire contents of each of the above-referenced applications are hereby incorporated by reference for all purposes.

TECHNICAL FIELD

The present disclosure relates to a component having a flange connection element connectable to a flange connection counterpart of another component by bolts and/or screws, the flange connection element comprising a contact surface to be pressed against a contact surface of the flange connection counterpart. Specifically, the component may be a fluid guiding component comprising a fluid duct connectable to a fluid duct of the other component by the flange connection element.

BACKGROUND AND SUMMARY

When a flange connection element is used to connect fluid guiding ducts with each other, it is important to avoid leakages at the interface between the two components. For this purpose, it is important that the pressure is equally distributed over the contact surface of the flange connection.

However, in standard flange connections, where the contact surface has holes through which the screws or bolts are guided for pressing the contact surface against the flange connection counterpart, it is sometimes difficult to obtain sufficient leakage tightness. In particular, if the distance between the bolts or screws is too high, for example because of a rectangular shaped interface, the contact pressure may be located around the screw holes with a very high value, whereas the center of the flange has little contact pressure. Further, due to the high contact pressure on the edges, the flange is prevented from performing the necessary relative movement under thermal expansion of the flange, such that the contact pressure in the center of the flange is additionally lowered. Conventional ways of avoiding this problem have been to increase the number of screws. However, this leads to additional costs and additional mounting space. Alternatively, the geometry of the interface could be changed to reduce the distance between the screws. In particular, a square shaped flange with four screws is recommended for large dimensions. Further, a round flange with three screws at 120° is recommended for small dimensions. However, such a change of the geometry requires a redesign and therefore involves additional costs. Further, increasing the height of the screws may have positive effect on the problem, but also involves higher costs. Increasing the number of layers on the gasket could equally help, but not in all cases.

One further option would be a heat treatment of the component, which can help to release internal strains in the material and bring more dimensional stability to the component, especially through thermal cycles. Again, this involves additional costs.

BRIEF DESCRIPTION OF THE FIGURES

The present disclosure is therefore directed to providing a component having a flange connection element providing improved leakage tightness while avoiding the problems associated with the above discussed known measures. This object is solved in a first aspect by a component having a flange connection element connectable to a flange connection counterpart of another component by bolts and/or screws, the flange connection element comprising a contact surface to be pressed against a contact surface of the flange connection counterpart, wherein the contact surface of the flange connection element is formed such that it does not completely surround at least one of the bolts and/or screws. In another aspect, the component may have a flange connection element connectable to a flange connection counterpart of another component by bolts and/or screws, the flange connection element comprising a contact surface to be pressed against a contact surface of the flange connection counterpart wherein the flange connection element has a recess in at least one of its side surfaces reducing the contact pressure in an edge part of the contact surface extending below the recess.

The present disclosure provides, in a first aspect, a component having a flange connection element connectable to a flange connection counterpart of another component by bolts and/or screws, the flange connection element comprising a contact surface to be pressed against a contact surface of the flange connection counterpart. The present disclosure is characterized in that the contact surface of the flange connection element is formed such that it does not completely surround at least one of the bolts and/or screws.

Figure 1:
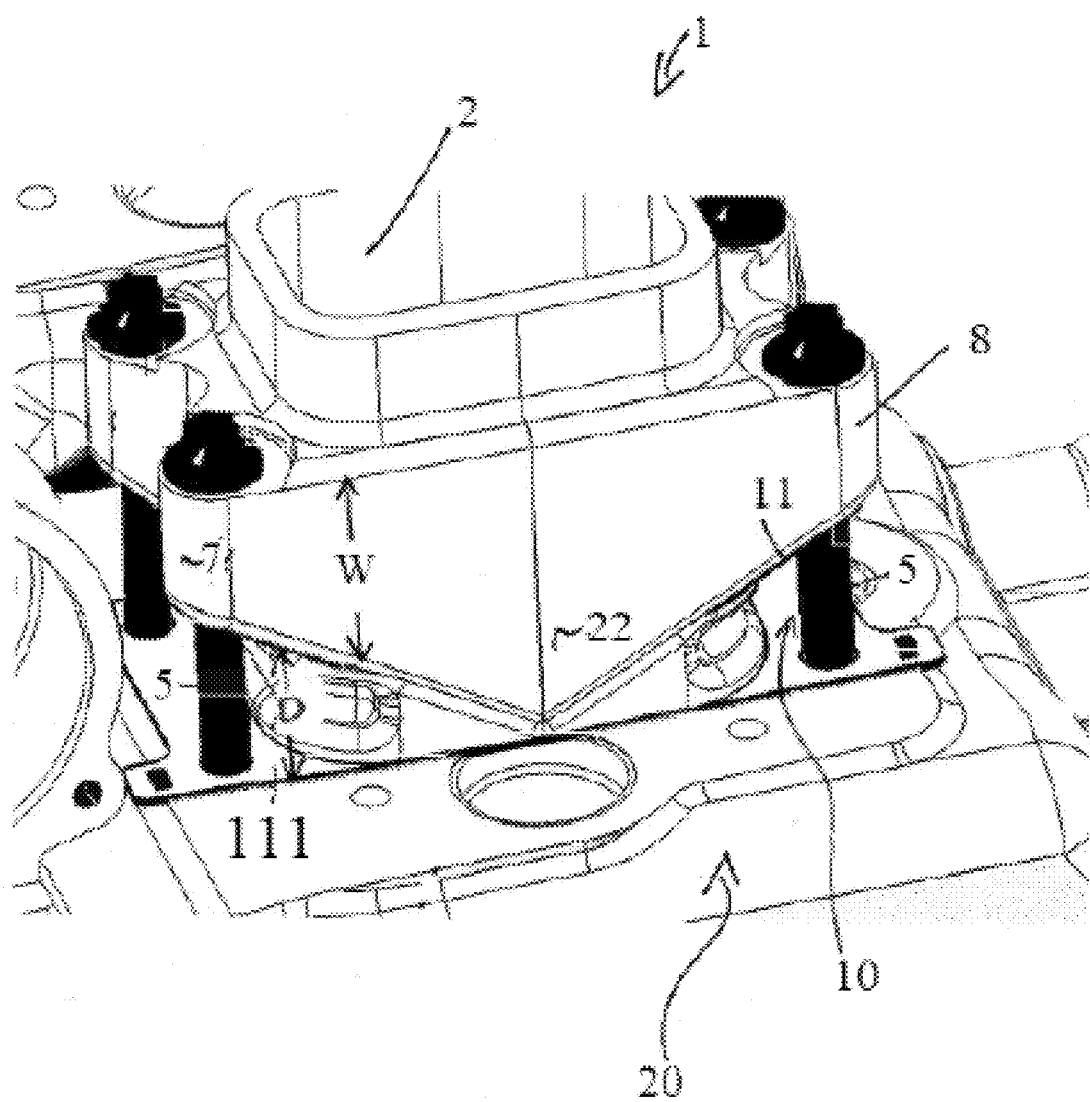

The inventors of the present disclosure have realized that thereby, the contact pressure in the contact surface next to the screws and/or bolts can be reduced, and the contact pressure in the remaining parts of the contact surface can be increased.

In some aspects, the contact surface of the flange connection element does not surround the at least one bolt and/or screw at all. In particular, this means that there is no line drawn between two points of the contact surface that would cross the bolt and/or screw. Further, the contact surface may extend at a certain distance to the at least one bolt or screw.

In one embodiment, the flange connection element has at least one supporting part for the at least one bolt and/or screw arranged in such a way that there is a clearance between the supporting part and the flange connection counterpart and/or the level of the contact surface of the connection element in the direction perpendicular to the contact surface. This means the supporting part supporting the bolt and/or screw is not in contact with the flange connection counterpart when the flange connection element is mounted to the contact surface of the flange connection counterpart. Therefore, there is no contact pressure between the supporting part and the flange connection counterpart.

Therefore, in some aspects, the contact surface of the flange connection element does not extend into the area of the supporting part. This can be provided by removing, from a standard flange connection design, the material of the contact surface around the screws and/or bolts.

In one aspect, the supporting part has a hole for mounting the screw and/or bolt. For example, the supporting part may have a hole and a step portion on which a screw head or a nut can be supported.

In a one embodiment of the present disclosure, the supporting part projects from a side wall of the component to extend outside of the area of the contact surface, such that a tensioning of the screw and/or bolt creates a bending force in an area of the component where the supporting part is connected to the side wall. Such a construction will distribute the contact pressure more evenly within the contact surface.

In some aspects, the supporting part has a clearance with respect to the level of the contact surface that decreases towards the middle of the flange connection element. Alternatively or in combination, the supporting part may have a width in a direction perpendicular to the contact surface that increases towards the middle of the flange connection element. Both measures, especially when combined, will concentrate more force in a middle part of the flange connection element, and therefore provide more contact pressure in this area.

The component may in particular have two supporting parts arranged on the opposite sides of the flange connection element, which together form a yoke for transmitting contact pressure to a middle part of the flange connection element.

The two supporting parts arranged on the opposite sides of the flange connection element may together have a general V-shape. Such a V-shape will distribute the pressure such that there is sufficient contact pressure in the middle part of the flange connection element, because the tip of the V-shape is arranged in this area.

In a preferred embodiment of the present disclosure, the contact surface of the flange connection element is surrounded by at least two and in some embodiments by at least three or four bolts and/or screws. In some aspects, what has been described above with respect to at least one bolt and/or screw also applies to the at least two and in some embodiments at least three or four bolts of the flange connection. Further this may apply to all the bolts and/or screws of the flange connection.

Further, the component may have at least two and in some aspects at least three or four supporting parts surrounding the contact surface of the flange connection element. Again, what has been described above with respect to the at least one supporting part may also apply to the at least two and at least three or four supporting parts and in some embodiments to all supporting parts.

The present disclosure provides, in a second aspect, a component having a flange connection element connectable to a flange connection counterpart of another component by bolts and/or screws, the flange connection element comprising a contact surface to be pressed against a contact surface of the flange connection counterpart. The second aspect is characterized in that the flange connection element has a recess in at least one of its side surfaces reducing the contact pressure in an edge part of the contact surface extending below the recess.

In particular, the inventors of the present disclosure have realized that by providing a recess in a side surface of the flange connection element, the edge load can be reduced in the contact surface extending below the recess. Thereby, the component is allowed to move relative to the flange connection counterpart under thermal extension more easily. The reduction of the contact pressure in the edge part is provided because the material of the flange connection element between the edge part of the contact surface and the recess is allowed to bend more easily than if no recess was provided.

The second aspect can be used both with a conventional flange design, as well as with an inventive flange design according to the first aspect described above.

In a component according to the second aspect, the flange connection element may have at least one supporting part for at least one bolt and/or screw. The supporting part may be a conventional flange connection supporting part, or a supporting part as described above with respect to the first aspect of the present disclosure.

In any case, the supporting part may have a hole for mounting the screw and/or bolt.

In a first variant of the second aspect, the recess may be arranged in the side surface of the supporting part. In some aspects, this variant is may be used when the supporting part has a conventional design, e.g. is formed as a plate.

In particular, the first variant may be used when the contact surface of the flange connection element extends beneath the supporting part, and may cover the entire lower surface of the supporting part.

Alternatively, or in addition, the first variant may be used when the contact surface surrounds the screw and/or bolt at least in part and/or may surround the screw and/or bolt completely. For example, in such construction, the supporting part may be a plate-like-element having a hole for the screw and/or bolt, wherein the contact surface extends over the entire lower surface of the plate-like-element. In this case, the recess may extend along the side surfaces of the plate-like-element.

In the second variant, the recess may be arranged in an area of the flange connection element arranged between the supporting part and the contact surface. In some aspects, this second variant may be used in combination with a design of the supporting part according to the first aspect of a discussed above, i.e. having a supporting part projecting from a side wall of the component and/or having a clearance with respect to the flange connection counterpart and/or the level of the contact surface.

In such a construction, the recess may extend at least in an area below the supporting part or in a side wall of the flange connection element from which the supporting part projects in an area above the recess.

In one embodiment, which may be combined with the first and/or the second variant described above, the recess is formed by a groove extending along a side surface of the flange connection element. In particular, the groove may extend with a distance to the contact surface in the side surface of the flange connection element. The distance between the groove and the contact surface defines the thickness of the material arranged above the edges of the contact surface, and therefore the bending properties of this part of the flange connection element.

In some aspects, the distance between the recess and the contact surface is generally constant at least over part of the groove, and in some embodiments over the main part of the extension of the groove. Thereby, the edge load is evenly reduced along the extension of the groove.

In the following, embodiments of the present disclosure, which can be applied both to the first aspect, the second aspect, and a combination of the first and second aspect, are described.

In an embodiment of the present disclosure, the flange connection element and/or the contact surface has an extension in a first direction that is larger than the extension in a second, perpendicular direction. In such a construction, the advantages provided by the present invention are particularly important, because the longer extension in a first direction will make it more difficult to provide sufficient contact pressure in a middle section of the first direction with conventional means, and therefore the advantages provided by the present disclosure are more important.

When combined with the second aspect of the present disclosure, the recess and in particular the groove forming the recess may extend along at least one and possibly along at least two opposing side surfaces extending in the second, shorter direction. This is because along the shorter direction, there is more edge load, which is then reduced by the recess.

Alternatively or in addition, the recess of the second aspect is not provided at least in the middle section of at least one, and including two opposing side surfaces extending the first, longer direction. This is because in this area, the contact pressure is not as high, anyway.

In some aspects, the groove extends over the entirety of the two opposing short side surfaces, and into the two opposing longer side surfaces, but does not reach into a middle section of the longer side surfaces.

In an alternative embodiment, however, the groove of the second aspect of the present disclosure may also extend around the entire circumference of the flange connection element.

Further, the flange connection element and/or the contact surface may have a general form of a rectangle with different side lengths, and/or the general form of an oval. The rectangle may have sharp or rounded edges.

In a one embodiment, the flange connection element is connectable to the flange connection counterpart by four bolts and/or screws arranged in the corners of a rectangle. This means that the center points of the bolts and/or screws form a rectangle. In some aspects, the center lines of the screws and/or bolts form the four side edges of a virtual cuboid.

In some embodiments, a first side of the rectangle formed by the bolts and/or screws is longer than a second side of the rectangle.

Alternatively or in combination, a first side or two opposing first sides of the rectangle intersect with the contact surface. This means that if a line is drawn between the central points of two bolts and/or screws on at least one and in some aspects two opposing first sides, this line will extend above the contact surface. This is of particular advantage if this first side or these two opposing first sides are the longer sides because this will allow to provide more contact pressure in the middle section of the flange connection element along these first sides.

Again, alternatively or in combination, a second side or two opposing second sides of the rectangle does or do not intersect with the contact surface. This means that a line drawn between center points of two adjacent bolts and/or screws along a second side and or along two opposing second sides will not extend above the contact surface, but next to the contact surface. In particular, the contact surface may be arranged between these opposing second sides of the rectangle. In some aspects, the second sides are the shorter sides. Thereby, pressure is reduced along these sides.

In particular, the supporting parts may project from the shorter, second sides in a direction of the first, longer sides.

Further preferably, the recess and/or groove of the second aspect may be provided on the second, shorter sides. In some aspects, the groove may be below the supporting parts.

The contact surface may extend substantially along the first side and/or the first sides. Alternatively or in combination, the contact surface may extend within a distance to the second side or second sides.

In a preferred embodiment of the present disclosure, the contact surface essentially extends in a single plane. This plane forms a pressing plane when pressing the contact surface to the contact surface of the flange connection counterpart.

In a further preferred embodiment of the present disclosure, a sealing element is provided between the contact surface of the component and the flange connection counterpart. The sealing element may extend from the contact surface to at least one and preferably at least two screws and/or bolts. In particular, if the first aspect of the present disclosure is applied, it may be difficult to exactly position the sealing element if it is only arranged in the area of the contact surface. Therefore, by having the sealing element extend to at least one and at least two screws and/or bolts, the screws and/or bolts can be used for positioning the sealing element. In some aspects, the sealing element surrounds at least one including at least two screws and/or bolts. This will make the positioning particularly easy. The sealing element may be provided with holes for the at least one and preferably at least two screws and/or bolts.

The contact surface may be provided with a structure for improving the sealing qualities.

The component of the present disclosure may be a fluid guiding component. In particular, the component may comprise a fluid duct connectable to a fluid duct of the other component by the flange connection element. In some aspects, the contact surface surrounds the fluid duct. The fluid duct may extend through the flange connection element in a direction perpendicular to the contact surface.

Alternatively or in combination, the contact surface may be provided with a seal.

The inventive component may, in a preferred embodiment, comprise at least two flange connection elements described above. The flange connection elements may have contact surfaces extending parallel to each other. Further, the contact surfaces of the two flange connection elements may extend in the same plane.

Alternatively or in combination with this, flange connection elements may be arranged on a fluid guiding element of the component that extends in a direction that is essentially parallel to a plane of at least one contact surface and parallel to the planes of the at least two contact surfaces.

In a one embodiment of the present disclosure, the inventive component is part of an internal combustion engine. In particular, the component may be a component of an air inlet system and/or of an exhaust system of the internal combustion engine. In particular, the component may be an air intake manifold and/or an exhaust gas manifold connectable to a cylinder head of the internal combustion engine.

The present disclosure further comprises an internal combustion engine comprising at least one component as described above. In some aspects, the internal combustion engine comprises several components as described above.

The component of the present disclosure may be formed from metal. In some aspects, the component is formed from iron or from steel. The component of the present disclosure may be formed integrally from a single or multiple materials. For example, the component may be formed by casting and/or machining.

The present disclosure will now be described using drawings and embodiments.

Figure 2:
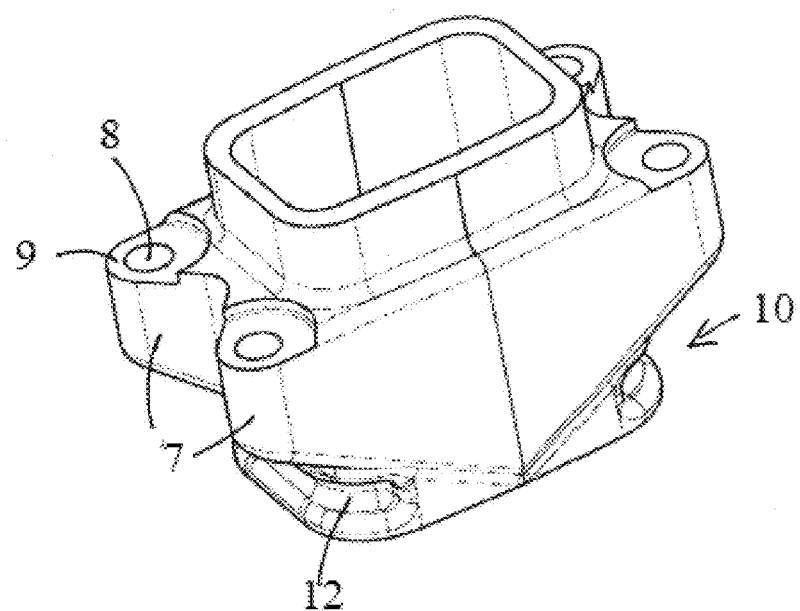
Figure 3:
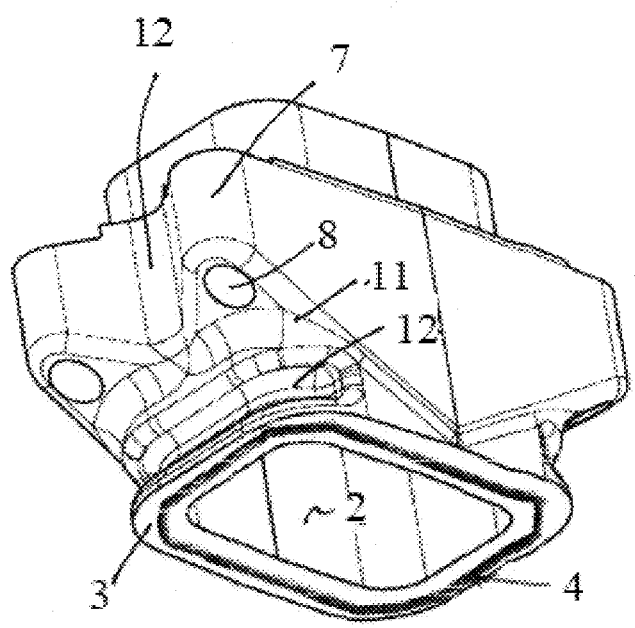
Figure 4:
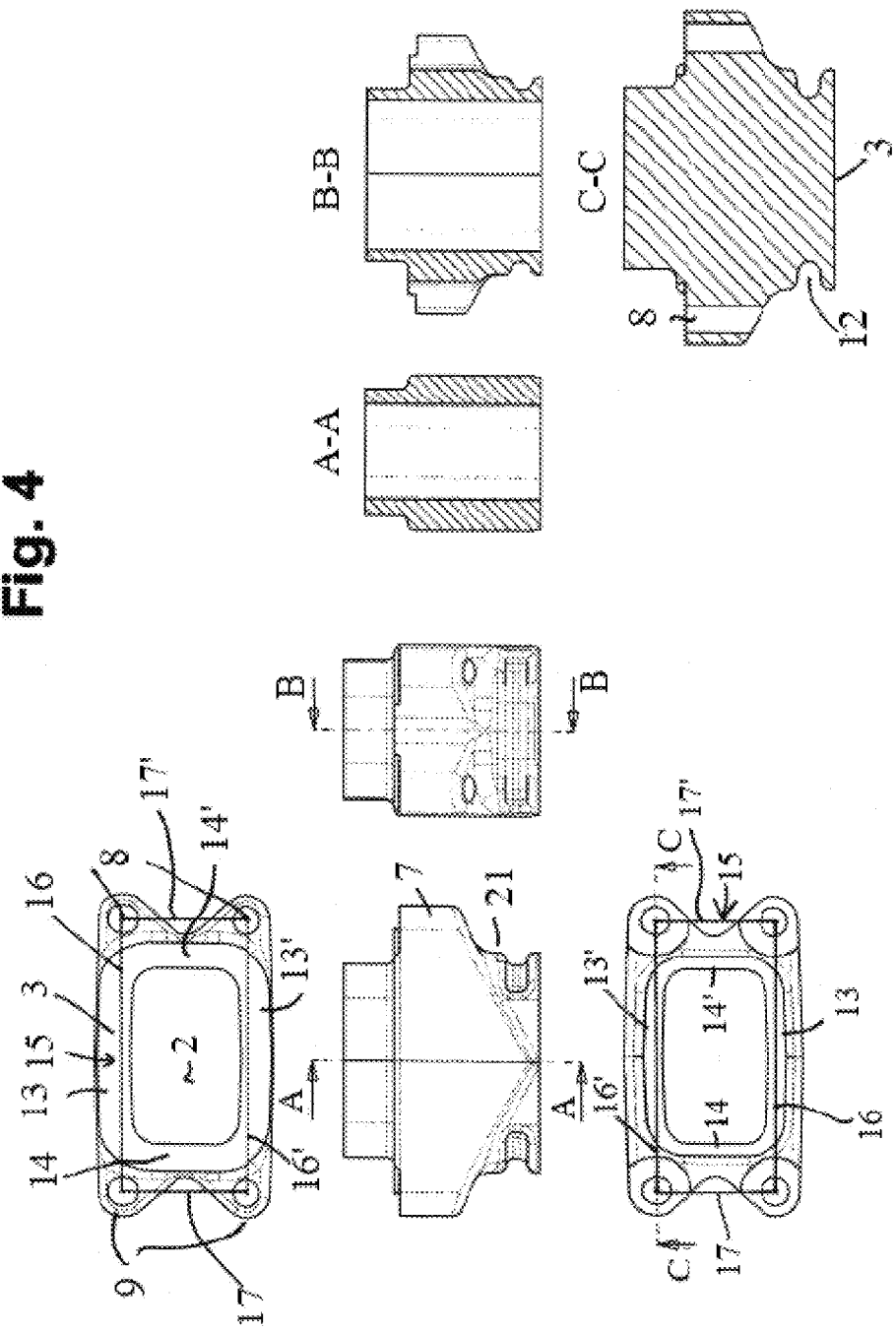
Figure 5:
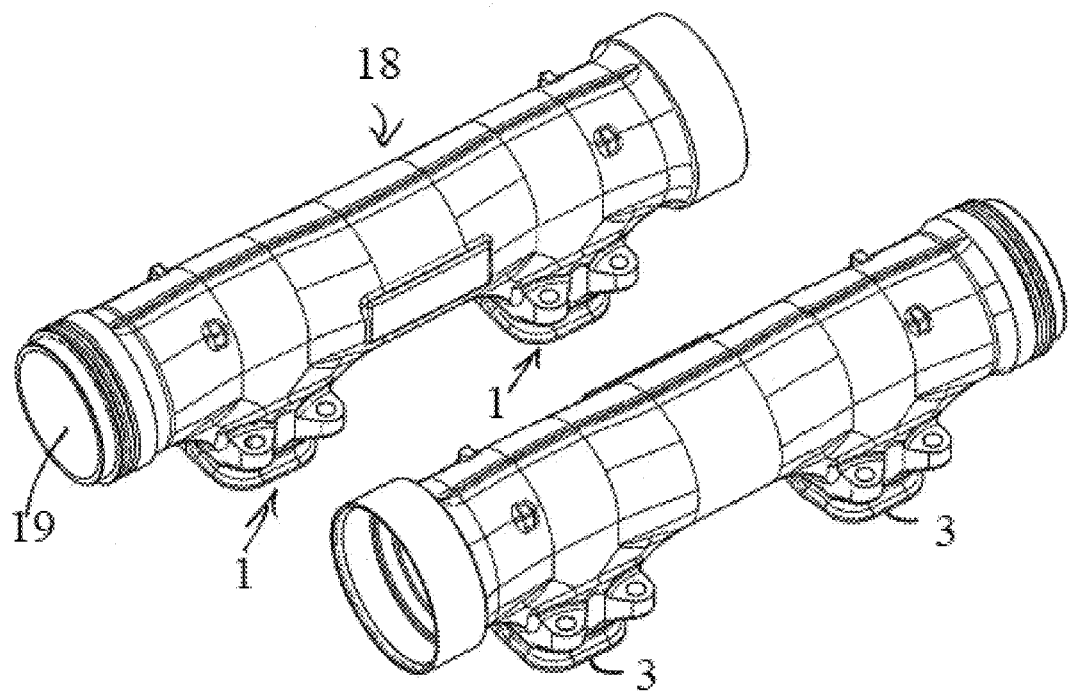
Figure 6:
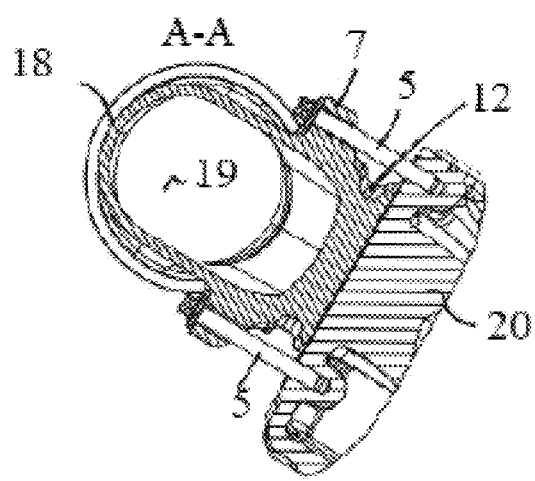
Figure 7:
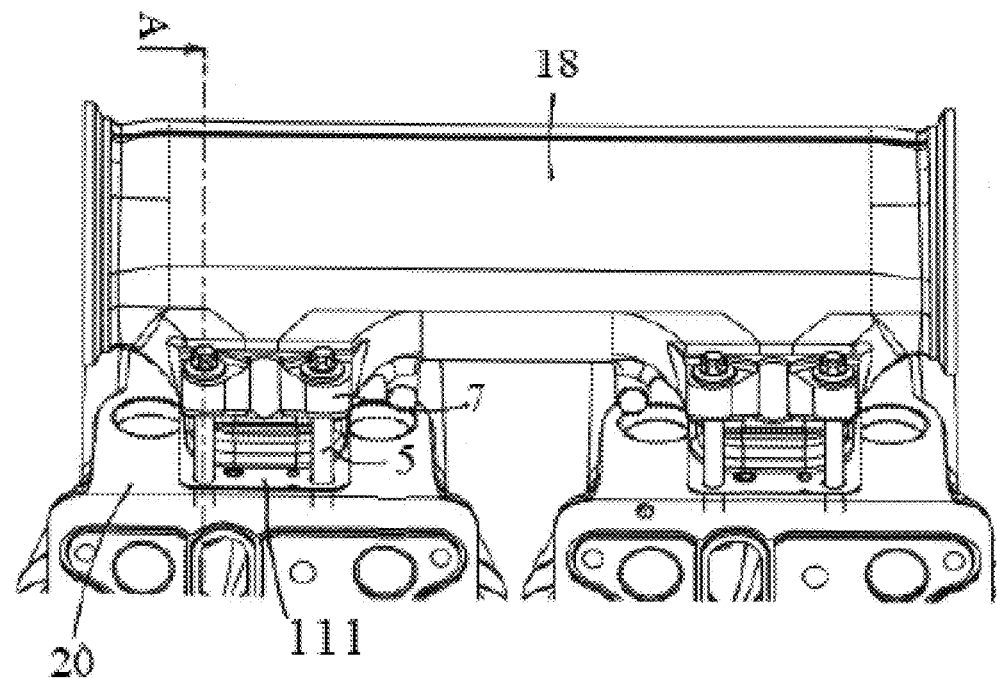
Figure 8:
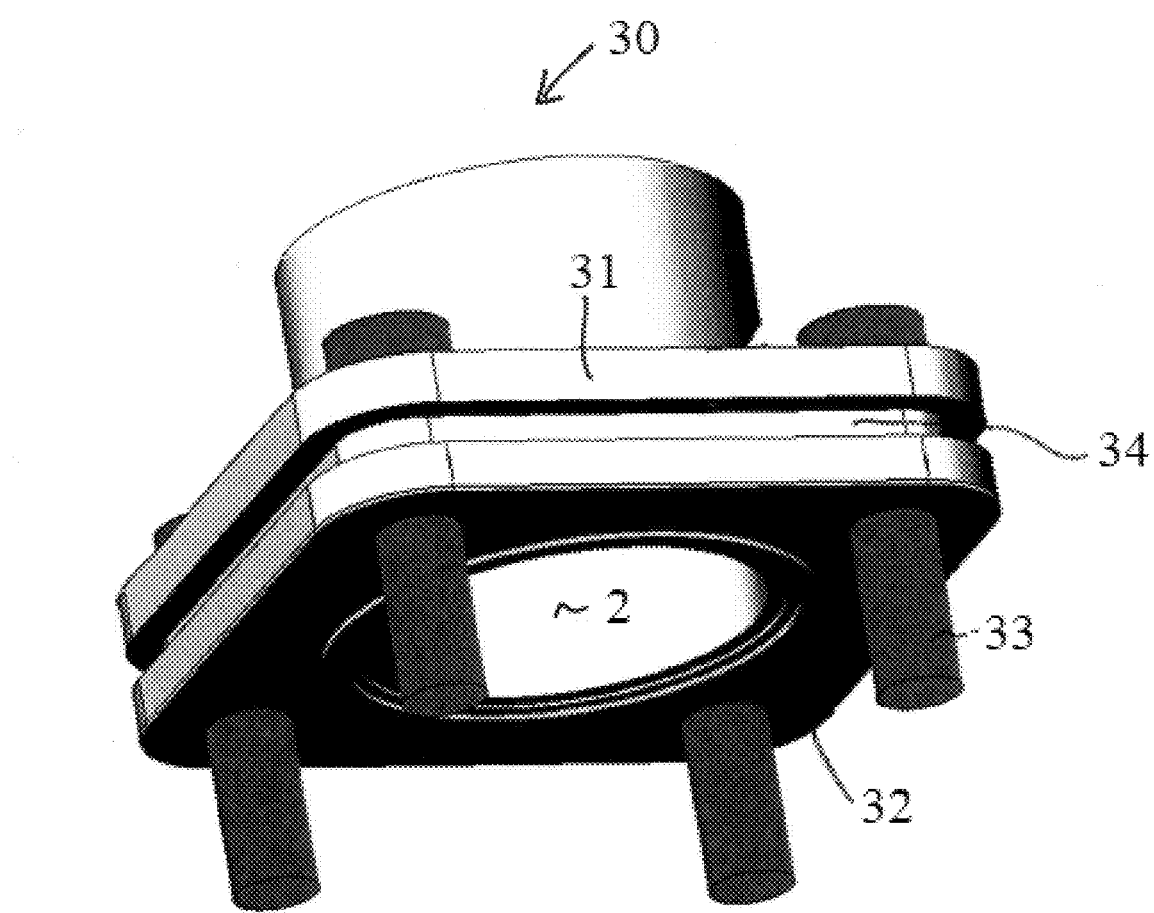

FIG. 1 shows: A perspective view of a first embodiment of a flange connection element using screws and/or bolts;

FIG. 2 shows: the first embodiment of a flange connection element in a perspective view from above;

FIG. 3 shows: the first embodiment of a flange connection element in a perspective view from below;

FIG. 4 shows: a bottom, two side views, a top view and three cuts through the first embodiment of a flange connection element;

FIG. 5 shows: a second embodiment of a component comprising a fluid duct comprising two flange connection elements as described with respect to the first embodiment;

FIG. 6 shows: a cut through view of the component of the second embodiment connected to another component;

FIG. 7 shows: a side view of the component of the second embodiment attached to another component;

FIG. 8 shows: a third embodiment where only the second aspect of the component is implemented.

DETAILED DESCRIPTION

A first embodiment of a component will now be described with respect to FIGS. 1 to 4. The first embodiment combines the first and the second aspect of the present disclosure. However, the two aspects of the present disclosure as shown in the first embodiment could also be provided on their own and independently from each other.

In the embodiment, the component 1 is a fluid guiding component, having a fluid duct 2 connectable to a fluid duct of another component 20 via a flange connection element. In fact, in the embodiment shown in FIGS. 1 to 4, the component is essentially formed only by the flange connection element. The component may have other parts not shown in FIGS. 1 to 4, extending from the open side of the duct 2. Alternatively, the component may only have the elements shown in FIGS. 1 to 4.

The flange connection element of the component 1 is connectable to a flange connection counterpart of the another component 20 by screws 5. For this purpose, the flange connection element has holes 8 through which the screws 5 extend, and a step 9 on which the screw heads may rest to exert pressure on the flange connection element. Instead of screws, bolts could be used.

The flange connection element has a contact surface 3, shown in FIG. 3, with which it is pressed against a contact surface of the flange connection counterpart of the other element 20. Sealing structures 4 may extend along the contact surface 3. The contact surface extends along a plane perpendicular to the direction of the screws 5.

As can be seen from FIG. 3, the contact surface extends around the duct 2 for sealingly connecting the duct 2 of the component 1 to a duct of the other component 20. As can be seen in FIG. 1, a sealing element 111 may be provided between the contact surface 3 of the component 1 and the contact surface of the flange connection counterpart of the other component 20.

According to a first aspect of the present disclosure, the contact surface 3 is reduced, as compared to a conventional construction, by removing all the material of the contact surface around the screw holes 8 of the flange connection element.

Therefore, according to the first aspect, the contact surface 3 does not surround the screws 5. In particular, all four screws used in the embodiment shown in FIGS. 1 to 4 are arranged outside of the contact surface.

Further, the flange connection element has supporting parts 7 for supporting the screws 5, provided with the holes 8. Because the material of the contact surface is removed around the screws, the supporting parts 7 have a clearance 10 with respect to the flange connection counterpart of the other component 20. In particular, the supporting parts 7 project from a side wall 21 of the flange connection element.

The clearance 10 of the supporting parts 7 decreases from two opposing sides of the flange connection element towards a middle section. This means that the distance D between a lower surface 11 of the supporting parts and the level of the contact surface decreases from two opposing sides towards a middle section of a flange connecting element. At the same time, the width W of the supporting part increases towards the middle section. The two supporting parts thereby form together a general V-shape.

This is of particular advantage because in the embodiment shown in FIGS. 1 to 4, the flange connection element has a first, longer side, and a second shorter side. The decrease of the clearance and the increase of the width are along the first, longer side. Thereby, more contact pressure is provided to the middle section 22 of the flange connection element which otherwise would receive lower contact pressures.

In the embodiment shown in FIGS. 1 to 4, the center points of the screws 5 and the screw holes 8 form a virtual rectangle 16 shown in the view from above and in the view from below in FIG. 4. This rectangle has two longer first sides 16 and 16' and two shorter second sides 17 and 17'.

As can be seen from the view from the top in the top left corner of FIG. 4, the second shorter sides 17 and 17' of the rectangle do not intersect with the contact surface 13. In fact, the contact surface 13 does not extend at all in the area between the screws or screw holes on the second, shorter side of the flange connection element.

In contrast, the longer sides 16 and 16' of the rectangle 15 intersect with the contact surface 13, which extends between the screws or screw holes along the longer sides of the flange connection element.

By this construction, the contact pressure in the middle section of the longer sides is increased, and the contact pressure along the shorter sides is decreased.

As can be seen from FIG. 4, the contact surface essentially forms a rectangle with rounded corners, having longer sides 13 and 13' and shorter sides 14 and 14'.

The longer sides 13 and 13' extend essentially along the longer sides 16 and 16' of the rectangle 15, while the shorter sides 14 and 14' extend with a certain distance, which is larger than the radius of the screw holes 8, next to the sides 17 and 17' of the rectangle 15.

However, the present disclosure is not restricted to a rectangle form of the contact surface, and may equally be applied for example to an oval or elliptic form having a longer and a shorter side.

If the flange connection element has a longer and shorter side, the supporting parts 7 may project from the side walls of the shorter sides in the direction of the longer sides.

In the embodiment shown in FIGS. 1 and 4, the supporting parts 7 are arranged in the four corners of the flange connection element. Along the longer sides, the supporting elements 7 are joined by a side wall of the flange connection element, the side wall extending substantially in a plane perpendicularly to the contact surface 3 and in some aspects having a V-shape.

The two opposing supporting parts together with the side wall therefore form a yoke directing the force applied by the screws into the middle section 22 of the flange connection element.

Along the shorter sides, the supporting parts 7 separately project from the side wall in the embodiment shown in FIGS. 1 to 4. However, in an alternative embodiment, they may equally be joined by a side wall. However, also in this case, the side wall joining the supporting parts 7 along the shorter side may have a clearance with respect to the flange connection counterparts and/or a distance D with respect to the plane of the contact surface 3.

As can be seen in FIG. 1, in the first embodiment, there is a sealing element 111 extending beyond the contact surface 3 to the screws 5, and having holes through which the screws 5 extend. Thereby, the screws 5 can be used for correctly placing of the sealing element 111 with respect to the duct 2 of the component 1.

In a second aspect of the present disclosure, equally embodied in the embodiment shown in FIGS. 1 to 4, there is a groove 12 extending in the flange height.

This feature brings more flexibility on the edges of the contact surface and therefore allows a sliding movement of the component with respect to the other component under temperature changes because of thermal expansion.

In the embodiment shown in FIGS. 1 and 4, where the second aspect is combined with the first aspect, the groove 12 extends below the projecting supporting parts 7 along the shorter sides, and slightly around the corners into the longer sides under the supporting parts. However, it does not extend into the middle section, where the pressure should not be reduced.

In the embodiments shown, the groove 12 reduces the thickness of the side walls of the fluid duct, which preferably may have flat inner side walls also in the area of the groove 12 in order to avoid fluid disturbances. The groove leaves some material above the contact surface, which however bends more easily, therefore reducing the edge loads.

The second aspect of the present disclosure is, even though it is combined in the first embodiment with the first aspect, independent of the first aspect, and can also be used in any kind of flange connection element.

In particular, the groove can be implemented on all axial bolted or screwed flanges, where high pressure contact is located around the screws or bolts, in order to release the contact pressure somewhat on the outer edges of the flange where no sealing is needed.

An embodiment of the second aspect not embodying the first aspect is shown in FIG. 8. The component 30 of the third embodiment of the present disclosure shown in FIG. 8 equally is a fluid guiding component having a fluid duct to be connected by the flange connection element 31 to a flange connection counterpart. In the embodiment shown in FIG. 8, the flange connection element 31 is a plate-like-element having holes for the screws and/or bolts 33, wherein the contact surface extends essentially over the entire lower surface 32 of the plate-like-flange connection element 31.

The plate-like-element 31 therefore forms a supporting part for the screws and/or bolts that does not have a clearance with respect to the flange connection counterpart, but is pressed by the screws and/or bolts onto the contact surface of the flange connection counterpart.

As shown in FIG. 8, the plate-like-element has a groove 34 extending along a side surface for reducing edge loads.

In the embodiment shown in FIG. 8, the groove 34 extends around the entire circumference of the plate-like-flange connection element 31. Further, the flange connection element is essentially square shaped.

However, also in case of conventional flange connection element, the groove 34 may only extend over parts of the circumference. In particular, the groove 34 may only extend around the corners and/or the areas surrounding the screws and/or bolts 33, but may not be present in at least one middle section of the flange connection element.

The components of the present disclosure may be made from metal, in particular from iron and preferably from steel. The components may be casted and/or forged and/or machined parts.

Both the supporting parts of the first aspect, and/or the groove of the second aspect, can be molded in the raw part, without additionally machining to reduce machining cost. Alternatively, the variable thickness in the flange height provided by a recess and/or groove may be produced by machining of the raw part. In some aspects, at least the contact surface and/or step portions for the screw heads and/or nuts may be machined in order to improve precision.

The present disclosure may be applied for providing a flange connection between different components of an internal combustion engine. In particular, the inventive flange connection may be used to connect an air inlet manifold and/or an exhaust gas manifold to a cylinder head of the engine.

This is shown in the second embodiment with respect to FIGS. 5 to 7. In these embodiments, the component 18 is an exhaust gas duct 19, provided with two flange connection elements 1 corresponding to the components shown in FIGS. 1 to 4, for connecting the exhaust gas duct 19 to cylinder heads 20.

As can be seen in FIGS. 5 to 7, screws 5 are used for connecting the flange connection elements of components 1 to the cylinder heads 20.

Using the present disclosure allows to use a geometry of the exhaust gas connection between the cylinder heads and the exhaust gas duct 19 that has a rectangle shape with a longer and shorter side, and therefore uses the available space in a better way, while at the same time providing a particular good leakage tightness.

Compared to state of the art flange designs, the present disclosure requires no additional machining and even fewer components by removing the sleeves. The improvement is achieved by a particular shape of the flange connection element without adding components or having to redesign the interface between the component and the other component.

The present disclosure can be applied to all axial bolted or screwed flange assemblies where axial sealing is needed. Typically, the present disclosure is of particular advantage where there is a long distance between the bolts and/or screws or low contact pressure.

The two aspects of the present disclosure can be combined, but can also be applied independently of each other. The particular dimensions of the various components and design features will usually be fine-tuned and adjusted by simulation to the specific design of the interface.

The present disclosure allows a better repartition of the contact pressure, and/or reduces edge loads. Thereby, improved sealing is achieved.

The invention claimed is:

1. A component having a flange connection element connectable to a flange connection counterpart of another component by bolts and/or screws, the flange connection element comprising two short sidewalls and two long sidewalls, and a contact surface extending in a single plane to be pressed against a contact surface of the flange connection counterpart, the flange connection element having at least one supporting part for one of the bolts and/or screws, the supporting part projecting from one of the two short sidewalls of the flange connection element, wherein the flange connection element has a recess in the one of the two short sidewalls, reducing the contact pressure in an edge part of the contact surface of the flange connection element extending below the recess, wherein the recess is arranged in the one of the two short sidewalls intermediate the supporting part and the contact surface and is not provided in a middle section of either of the two long sidewalls, and wherein the contact surface is comprised of two long segments and two short segments, the two long segments respectively aligned with the two long sidewalls and the two short segments respectively offset from the two short sidewalls.

2. The component of claim 1, wherein the contact surface of the flange connection element is formed such that it does not completely surround at least one of the bolts and/or screws.

3. The component of claim 2, wherein the at least one supporting part for the at least one of the bolts and/or screws is arranged in such a way that there is a clearance between the at least one supporting part and the flange connection counterpart and/or the level of the contact surface of the flange connection element with the flange connection counterpart in a direction perpendicular to the contact surface, wherein the supporting part has a hole for mounting the at least one of the bolts and/or screws.

4. The component of claim 3, wherein the supporting part of the flange connection element extends outside of an area of the contact surface, such that a tensioning of the at least one of the screws and/or bolts will create a bending force where the supporting part is connected to the side wall.

5. The component of claim 3, wherein the supporting part of the flange connection element has a clearance with respect to the level of the contact surface of the flange connection element with the flange connection counterpart that decreases towards the middle of the flange connection element and/or wherein the supporting part has a width in a direction perpendicular to the contact surface that increases towards the middle of the flange connection element.

6. The component of claim 3, wherein the component has two supporting parts arranged on the opposite sides of the flange connection element, which together form a yoke for transmitting contact pressure to a middle part of the flange connection element, wherein the component has two supporting parts arranged on opposite sides of the flange connection element which together have a V-shape.

7. The component of claim 2, wherein the contact surface of the flange connection element is surrounded by at least two bolts and/or screws and/or wherein the component has at least two supporting parts surrounding the contact surface of the flange connection element.

8. The component of claim 1, wherein the recess is formed by a groove extending along the side surface of the flange connection element, the groove extending with a distance to the contact surface, the distance to the contact surface being constant at least over a main part of the extension of the groove.

9. The component of claim 1, wherein the contact surface has the form of a rectangle with different side lengths and/or of an oval.

10. The component of claim 9, wherein the groove extends along two opposing side surfaces extending in the second direction.

11. The component of claim 1, wherein the flange connection element is connectable to the flange connection counterpart by four bolts and/or screws arranged in the corners of a rectangle, wherein a first side of the rectangle is longer than a second side of the rectangle, and/or wherein a first side of the rectangle intersects with the contact surface and/or wherein a second side of the rectangle does not intersect with the contact surface, wherein the contact surface extends substantially along the first side and/or the contact surface extends with a distance to the second side.

12. The component of claim 1, wherein a sealing element is provided between the contact surface of the component and the flange connection counterpart, wherein the sealing element extends from the contact surface to at least one and screw and/or bolt.

13. The component of claim 1, wherein the component is a fluid guiding component and comprises a fluid duct connectable to a fluid duct of the other component by the flange connection element, the contact surface surrounding the fluid duct.

14. The component of claim 1, comprising at least two flange connection elements, the flange connection elements having contact surfaces extending parallel to each other and/or the flange connection elements being arranged on a fluid guiding element extending in a direction that is parallel to a plane of at least one contact surface.

15. The component of claim 1, wherein the component is an air intake manifold and/or exhaust gas manifold connectable to a cylinder head of an internal combustion engine.

16. An internal combustion engine comprising at least one component, wherein the component has a flange connection element connectable to a flange connection counterpart of another component by bolts and/or screws, the flange connection element comprising two short sidewalls and two long sidewalls, and a contact surface extending in a single plane to be pressed against a contact surface of the flange connection counterpart, and wherein, the contact surface of the flange connection element is formed such that it does not completely surround at least one of the bolts and/or screws and the flange connection element has a recess in at least one of the two short sidewalls, reducing the contact pressure in an edge part of the contact surface of the flange connection element extending below the recess, wherein the recess is arranged in the one of the two short sidewalls intermediate the supporting part and the contact surface and is not provided in a middle section of either of the two long sidewalls, and wherein the contact surface is comprised of two long segments and two short segments, the two long segments respectively aligned with the two long sidewalls and the two short segments respectively offset from the two short sidewalls.

17. An internal combustion engine comprising a cylinder head and at least one out of an air intake manifold and exhaust gas manifold having a flange connection element connectable to a flange connection counterpart of the cylinder head by bolts and/or screws, the flange connection element comprising two short sidewalls and two long sidewalls, and a contact surface extending in a single plane to be pressed against a contact surface of the flange connection counterpart, wherein the flange connection element has a recess in at least one of the two short sidewalls, reducing the contact pressure in an edge part of the contact surface of the flange connection element extending below the recess.

18. The internal combustion engine of claim 17, wherein the flange connection element has at least one supporting part for at least one bolt and/or screw, the supporting part projecting from the side surface of the flange connection element and having a hole for mounting the at least one screw and/or bolt, wherein the recess is arranged in a part of the side surface of the flange connection element extending between the contact surface and the supporting part.

* * * * *